United States Patent
Gage et al.

(10) Patent No.: US 8,982,678 B2
(45) Date of Patent: Mar. 17, 2015

(54) MULTI-LAYER RECORDING LAMINATION FOR SOLID IMMERSION MIRROR SERVO TRACK WRITING

(75) Inventors: Edward Charles Gage, Lakeville, MN (US); Jan-Ulrich Thiele, Sunnyvale, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/442,483

(22) Filed: Apr. 9, 2012

(65) Prior Publication Data

US 2013/0265860 A1    Oct. 10, 2013

(51) Int. Cl.
G11B 21/02 (2006.01)
G11B 7/00 (2006.01)
G11B 7/135 (2012.01)
G11B 5/596 (2006.01)
G11B 5/00 (2006.01)

(52) U.S. Cl.
CPC .......... G11B 5/59638 (2013.01); G11B 5/5965 (2013.01); *G11B 5/59655* (2013.01); *G11B 5/59661* (2013.01); G11B 5/59666 (2013.01); *G11B 2005/0021* (2013.01)
USPC .................. 369/13.33; 369/13.32; 369/13.24; 369/112.23; 369/112.09; 369/112.27; 360/114.02; 360/59; 720/659

(58) Field of Classification Search
USPC .......................... 369/43, 44.25, 44.26, 53.28
See application file for complete search history.

(56) References Cited

U.S. PATENT DOCUMENTS

| | | | |
|---|---|---|---|
| 6,183,606 B1 | 2/2001 | Kuo et al. | |
| 6,301,200 B1 * | 10/2001 | Aspen et al. | 369/275.2 |
| 6,445,667 B1 * | 9/2002 | Bernacki et al. | 369/100 |
| 6,487,148 B1 * | 11/2002 | Hsieh | 369/47.1 |
| 6,727,010 B2 | 4/2004 | Hanawa et al. | |
| 6,970,400 B1 * | 11/2005 | Wakabayashi et al. | 369/13.2 |
| 7,006,328 B2 | 2/2006 | Osawa | |
| 7,879,468 B2 | 2/2011 | Uchida | |
| 8,034,413 B2 | 10/2011 | Uchida | |
| 8,081,542 B1 * | 12/2011 | Grobis et al. | 369/30.03 |
| 2004/0001394 A1 * | 1/2004 | Challener et al. | 369/13.32 |
| 2005/0030845 A1 * | 2/2005 | Kim et al. | 369/44.26 |
| 2006/0005216 A1 * | 1/2006 | Rausch | 720/659 |
| 2008/0151409 A1 * | 6/2008 | Mizukoshi et al. | 360/75 |
| 2009/0123781 A1 | 5/2009 | Uchida | |
| 2010/0182714 A1 * | 7/2010 | Kanbe et al. | 360/59 |
| 2012/0026847 A1 * | 2/2012 | Shindo et al. | 369/13.33 |

* cited by examiner

*Primary Examiner* — Wayne Young
*Assistant Examiner* — Dionne Pendleton
(74) *Attorney, Agent, or Firm* — Hall Estill Attorneys at Law

(57) ABSTRACT

A data storage media may have at least a multi-layer recording lamination with a predetermined coercivity. The multi-layer recording lamination can be configured to record at least one servo format mark for a plurality of data tracks with a solid immersion mirror and program a data bit on the multi-layer recording lamination with a near field transducer.

20 Claims, 4 Drawing Sheets

FIG. 1
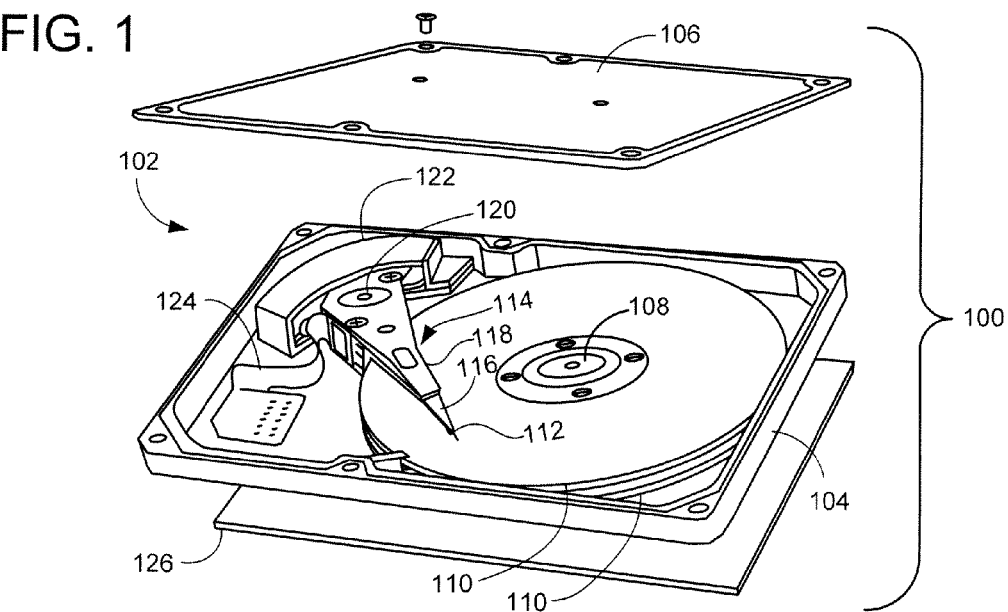
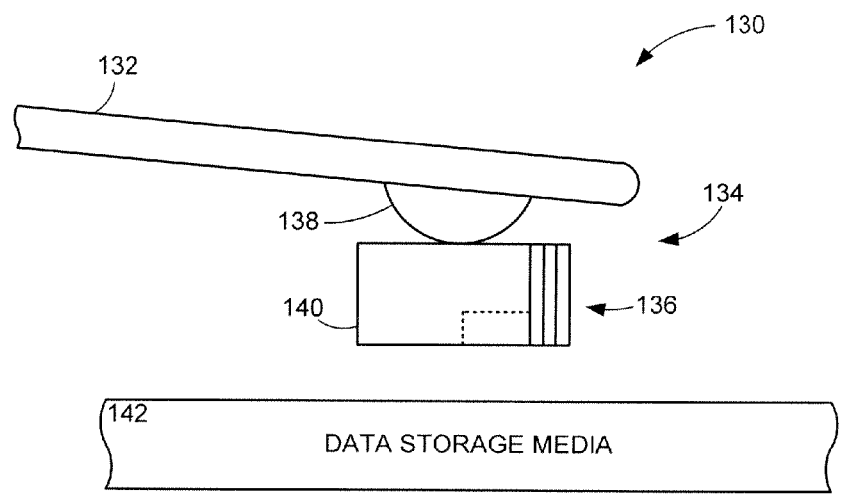
DATA STORAGE MEDIA
FIG. 2

FIG. 4
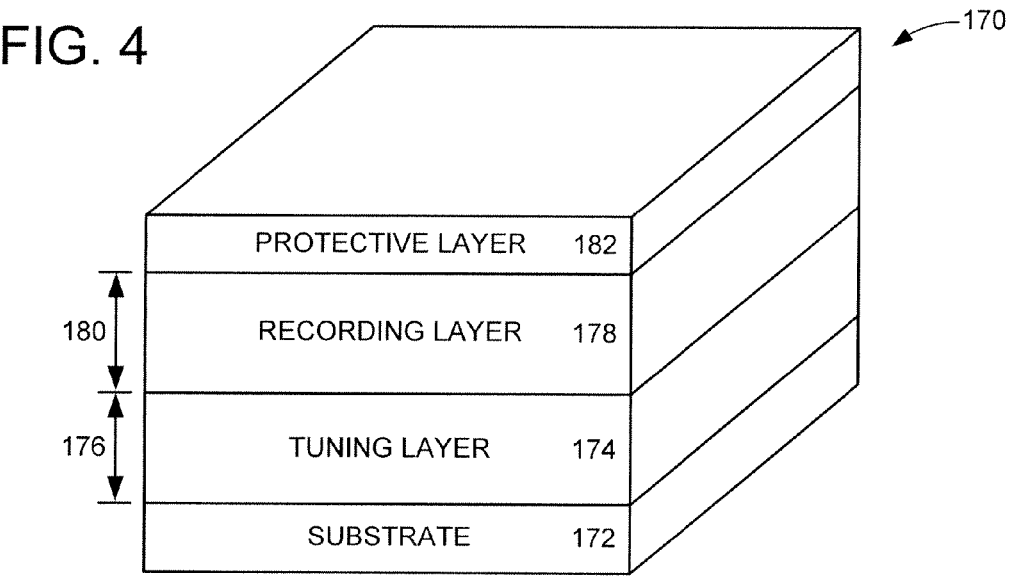
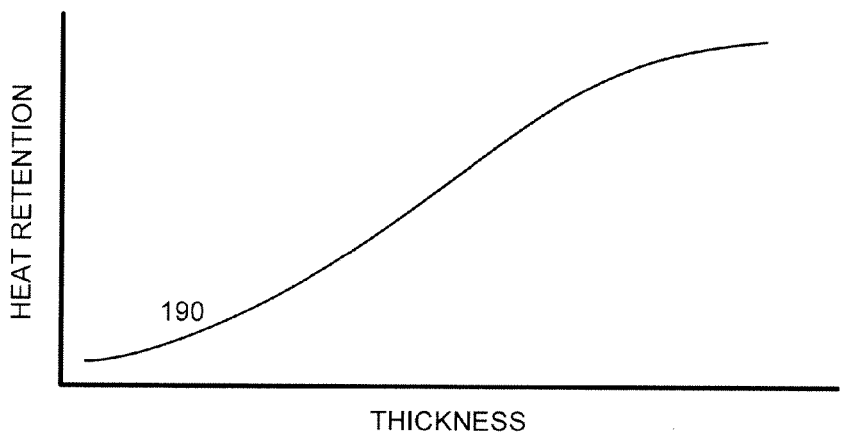
FIG. 5
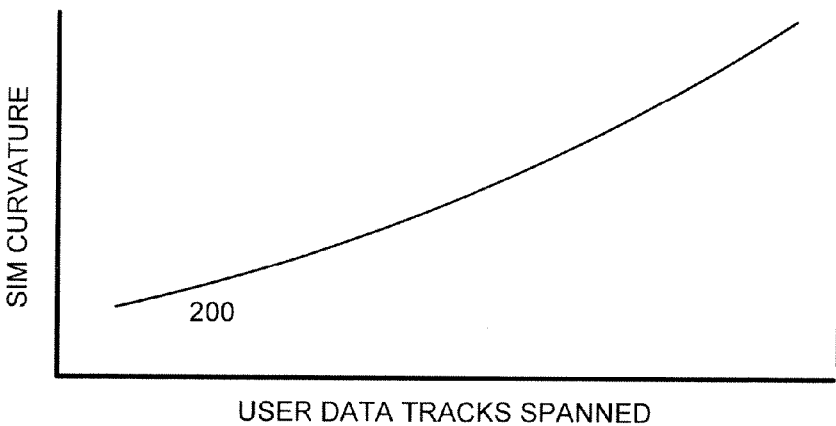
FIG. 6

MULTI-LAYER RECORDING LAMINATION FOR SOLID IMMERSION MIRROR SERVO TRACK WRITING

SUMMARY

Various embodiments of the present invention are generally directed to a data storage media configured with a multi-layer recording lamination with a predetermined coercivity. The multi-layer recording lamination can be configured to record at least one servo format mark for a plurality of data tracks with a solid immersion mirror and program a data bit on the multi-layer recording lamination with a near field transducer.

BRIEF DESCRIPTION OF THE DRAWINGS

FIG. 1 provides an exploded view of an exemplary data storage device.

FIG. 2 shows a block representation of selected portions of a data storage device.

FIG. 4 illustrates a block representation of a cross-section view of an example data storage media constructed in accordance with various embodiments.

FIG. 5 graphs structural data corresponding with various embodiments of a data storage media.

FIG. 6 plots structural data generally associated with data storage media constructed in accordance with various embodiments.

DETAILED DESCRIPTION

Figure 3A:
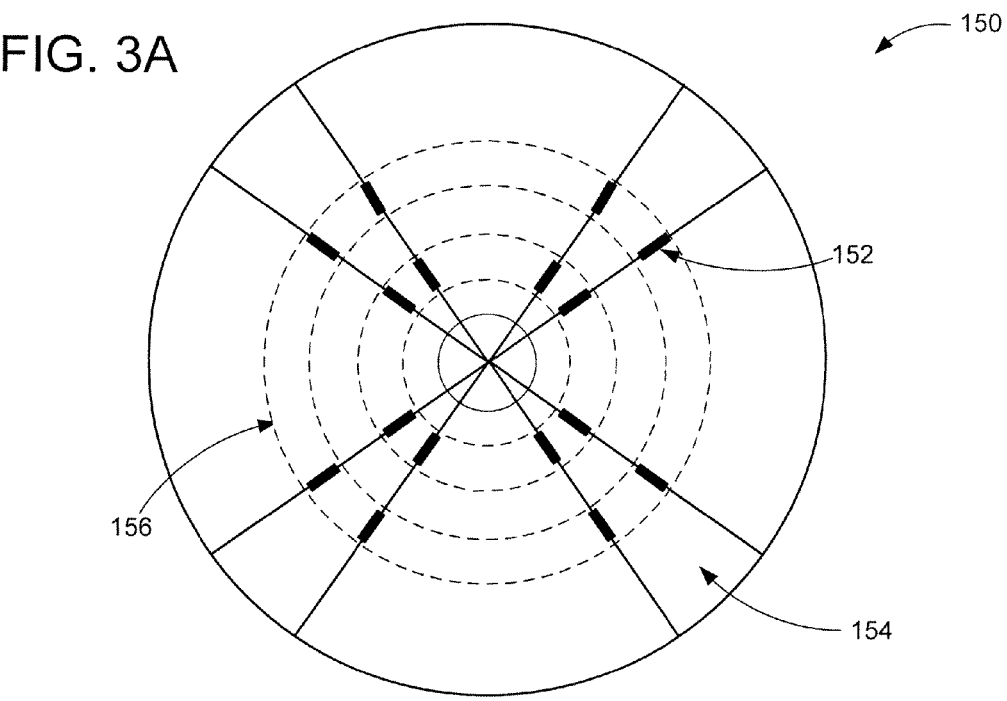
FIGS. 3A and 3B display various embodiments of a data storage media capable of being used in the data storage device of FIG. 1

Generally, the present disclosure provides a various embodiments of a data storage media capable of formatted with a solid immersion mirror and programmed with a near field transducer. With industry progressing to data storage devices with higher capacity and greater data access timing, heat assisted magnetic recording (HAMR) may provide faster data programming. However, increased magnetic coercivity corresponding to HAMR media can interfere with some data recording, particularly servo data formatted during media manufacture. Hence, HAMR data media capable of being formatted with servo data and programmed with user data has increasingly become an industry demand.

Accordingly, a data storage media can be configured as a multi-layer recording lamination having a predetermined coercivity that is capable of having at least one servo format mark recorded to a plurality of data tracks with a solid immersion mirror. The multi-layer recording lamination may further be configured to have a data bit programed with a near field transducer. The ability to individually use the solid immersion mirror and near field transducer to respectively format and program a HAMR data media can provide increased data media production while maintaining data accessibility.

A partially exploded perspective view of an example disc drive data storage device 100 is generally illustrated in FIG. 1. The device 100 is provided to show an exemplary environment in which various embodiments of the present invention can be advantageously practiced. It will be understood, however, that the various embodiments of the present disclosure are not so limited.

As shown, the device 100 includes a sealed housing 102 formed from a base deck 104 and top cover 106. An internally disposed spindle motor 108 may be configured to rotate any number of storage media 110. The media 110 can be accessed by a corresponding array of data transducers that are each supported by a head gimbal assembly (HGA) 112. It should be noted that while FIG. 1 shows two magnetic recording discs and four corresponding heads, other numbers of heads and discs (such as a single disc, etc.) and other types of media (such as optical media, etc.) can alternatively be utilized as desired.

Each HGA 112 can be supported by a head-stack assembly 114 ("actuator") that has at least a flexible suspension assembly 116, which in turn is supported by a rigid actuator arm 118. The actuator 114 may pivot about a cartridge bearing assembly 120 through application of current to a voice coil motor (VCM) 122. In this way, controlled operation of the VCM 122 can cause the transducers of the HGA 112 to align with tracks (not shown) defined on the media surfaces to store data thereto or retrieve data therefrom.

A printed circuit cable 124 can be configured to facilitate electrical communication between the actuator 114 and device control electronics on an externally disposed device printed circuit board (PCB) 126. The printed circuit cable 124 can comprise one or more circuits that allow communication of several different components of the data storage device 100 with the PCB 126.

FIG. 2 provides a block representation of portions of an example data access assembly 130 that can be used like the data storage device 100 of FIG. 1. The data access assembly 130 may be configured with a load beam 132 supporting a head gimbal assembly (HGA) 134 at the distal end of the load beam 132. While not required or limited to the configuration shown in FIG. 2, the HGA 134 and may have at least a transducing head 136 gimbaled for multi-axial rotation along pitch (x-axis) and roll (y-axis) directions via a gimbal dimple 138.

The transducing head 136 may be configured with data reading and programming capabilities partially or wholly facilitated by having a slider 140 that faces and interacts with one or more associated data storage media 142 to produce an air bearing 144 on which the head 136 floats during operation. The air bearing 144 can be passively and actively modulated to allow a data transducer 146 to access one or more data bit locations on the data storage media 142. The transducing head 136 may further have a heating means 148, such as a laser and electrical coil, capable of temporarily modifying the magnetic coercivity of the data storage media 142 and allowing more efficient data access with the data transducer 146.

Figure 3B:
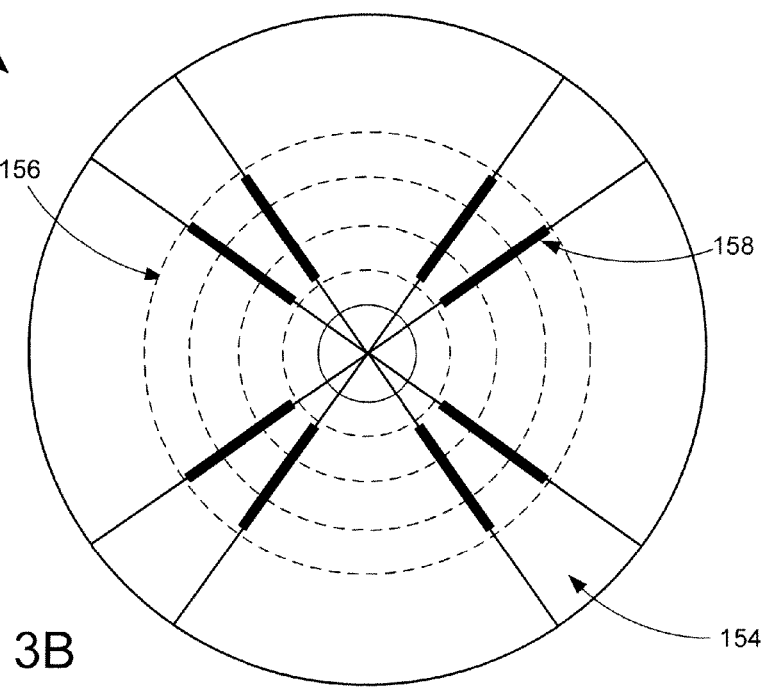

With the use of the heating means 148, the data storage media 142 can be configured with an elevated magnetic coercivity. An example data storage media 150 constructed with such heightened magnetic coercivity is generally illustrated in FIGS. 3A and 3B. In FIG. 3A, the data storage media 150 has undergone less than all the manufacturing processes associated with creating a media capable of data storage. The data storage media 150 is constructed with a series of a first type of servo format marks 152 positioned in predetermined locations to allow the subsequent writing of servo tracks 154, which can be configured in an unlimited variety of patterns, such as concentric circles and spirals. The servo tracks 154 can individually and collectively provide non-user defined data, such as error correction codes, that aid in providing reliable data reading and programming operations.

An increased magnetic coercivity of the data storage media 150 corresponding with HAMR operation can limit the ability of near field transducers (NFT) to create the servo format marks 152. While a solid immersion mirror (SIM) may be used concurrently with the NFT to temporarily lower the magnetic coercivity of the data storage media 150 and allow the NFT to program the first type of servo format marks 152, the combination of the SIM and NFT can bound the size of the servo format marks 152 to a reduced range that corresponds with the size of the reduced magnetic coercivity provided by the SIM.

As such, the reduced size servo format marks 152 produced with the combination 154 and consequently data storage media 150 due to an increased number of servo format of an NFT with a SIM may inhibit large-scale production of servo tracks marks 152 to be written during manufacturing. Such increased numbers of servo format marks 152 can particularly hinder media production as user programmed data tracks 156 reduce in width, which increases the overall number of servo format marks 152 to be written on a data storage media 150. Accordingly, the ability to program wide servo format marks 158, as shown in FIG. 3B, exclusively with a SIM allows for a writing curvature tuning that can produce servo format marks 158 that span multiple data tracks 156 of an elevated magnetic coercivity, HAMR capable, data storage media 150.

While the data storage media 150 may be configured to exclusively use a SIM to create the wider second type of servo format marks 158 displayed in FIG. 3B, use of an NFT to provide user defined data access operations may increase the compatibility and efficiency of the data storage media 150. However, various fundamental differences between SIM and NFT operation, such as optical versus magnetic programming, can create difficulties in media compatibility with exclusive operation of either a SIM or NFT head.

FIG. 4 provides a block cross-section representation of a data storage media 170 constructed in accordance with various embodiments to be compatible with both SIM written servo format marks and NFT written user data. While not required or limited, the data storage media 170 can be constructed on a substrate 172 that may or may not have a seed layer to aid in the formation of a tuning layer 174 with a first predetermined thickness 176.

The tuning layer 174 can be tuned with various material and structural characteristics, such as heat conductivity, magnetic coercivity, and thickness, to match a predetermined curvature of a SIM and allow for the writing of at least servo format marks exclusively with the SIM. The tuning layer 174 may further be tuned to provide the ability to write and read user data to a recording layer 178 with an NFT. That is, the tuning layer 174 can be precisely configured to allow exclusive SIM and NFT operation through material and structural tuning. For example, the thickness 176 of the tuning layer 174 can be selected to correspond with the thickness 180 of the recording layer 178 so that optics from the SIM do not interfere with the data storage capability of the recording layer 178.

Furthermore, the tuning layer 174 can be tuned in relation to a protective layer 182, such as an overcoat, to provide SIM and NFT operation without degrading the recording capability of the media 170. In various embodiments, the tuning layer 174 is a single continuous layer of material, while in other embodiments a multi-layer lamination collectively functions as the tuning layer 174. Regardless of the structural and material configuration of the tuning layer 174, the ability to tune media formatting provided by the exclusive use of a SIM and NFT allows for optimization of the data storage media 170 to conform to a variety of data storage device conditions, such as spiral servo tracks and increased areal density.

Design of the tuning layer's thickness, such as thickness 176 of FIG. 4, of a data storage media can be further evaluated and tuned in relation to the amount of heat retention over time, as plotted by the operational data 190 in FIG. 5. As can be appreciated based on the operational data 200, the thickness of the tuning layer can be designed to provide a variety of predetermined thermal profiles through a data storage media, which can be selected in response to the material configuration of the tuning layer, curvature of the SIM, and size of the servo format marks to provide media conducive to both SIM and NFT operation.

FIG. 6 graphs example operational data 200 of the curvature SIM in relation to the number of user data tracks spanned by servo format marks written by the SIM. As shown, the curvature of the SIM can be tuned to cover a wide range of user data tracks. As a non-limiting example, the SIM can be configured to condense a 830 nm laser radiation beam to a spot size of approximately 150 nm, which would span roughly three user data tracks with 40-60 nm track widths. The ability to tune both the SIM curvature and the tuning layer of the media can provide precise media manufacturing with servo format marks chosen to correspond with the number of user data tracks and allow use of non-HAMR servo-format writing algorithms for HAMR media.

Figure 7:
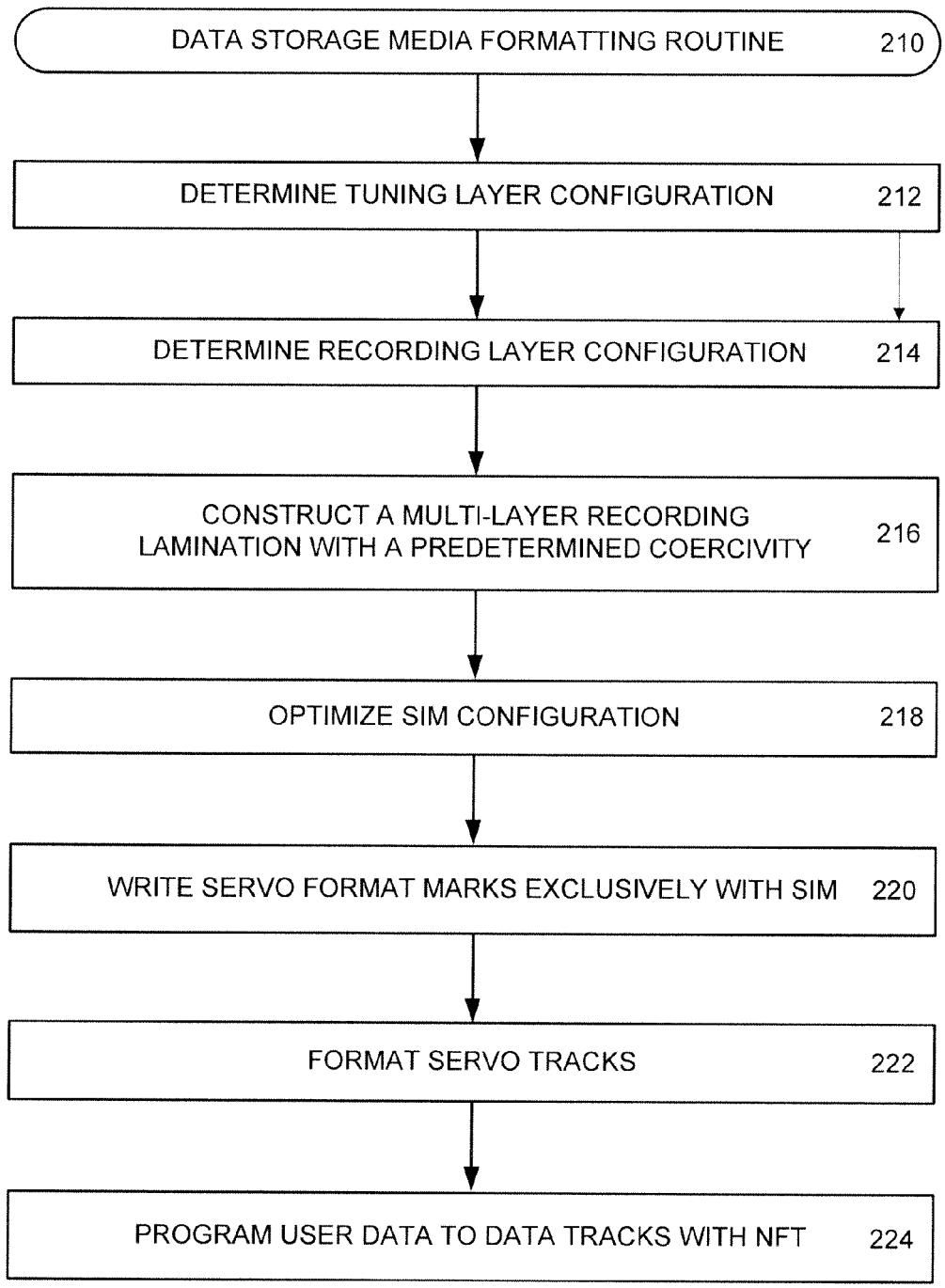
FIG. 7 provides a flowchart of an example data storage media fabrication routine illustrative of steps carried out in accordance with various embodiments.

FIG. 7 provides a flow chart for an example data storage media formatting routine 210 performed in accordance with various embodiments. Initially, the routine evaluates the design of the data storage media by determining the configuration of a tuning layer portion in step 212. As discussed in relation to FIGS. 4-6, the tuning layer can be constructed as one, or many, layers that have a thickness corresponding to a predetermined magnetic and thermal operational profile.

The resultant configuration of the tuning layer is next evaluated in relation to the configuration of a recording layer portion of the data storage media in step 214. While not limited to such evaluation criteria, step 214 can relate material, thickness, magnetic coercivity, and heat conductivity to the structural and operational characteristics of the tuning layer determined in step 212 to provide a recording layer or lamination that complements the tuning layer to provide formatting compatibility with either a SIM or NFT.

The chosen configurations of the tuning and recording layers from steps 212 and 214 are then constructed as a multi-layer recording lamination in step 216 that has a predetermined coercivity, such as an elevated coercivity conducive to HAMR data operations. It can be appreciated that the coercivity of the multi-layer recording lamination may be provided by any variety of material and positional configurations chosen in steps 212 and 214. For example, forming the recording layer between the substrate and tuning layer, opposite the orientation shown in FIG. 4, and with highly magnetic coercivity materials may contribute to constructing the predetermined coercivity.

With the multi-layer recording lamination designed and constructed, step 218 determines how to optimize the curvature and operation of the SIM, and consequently the size of the servo format marks to be written to the recording lamination. Through pulsed operation, the curvature of the SIM may be tuned in response to the number of user data tracks and the chosen servo-format writing algorithm to provide efficient media manufacturing, such as with multi-disk writing systems that simultaneously write non-user servo tracks for a plurality of media. Step 218 may further evaluate and choose size, number, and pattern for the servo tracks.

Next, step 220 writes servo format marks to the multi-layer recording lamination exclusively with a SIM. The SIM may be tuned with the use of pulsed operation where the duty cycle of a laser is adjusted to control the total amount of heat deposited, which can compensate for heatsink thickness present in the recording lamination. Regardless of whether pulsed operation is utilized to write the servo format marks step 222 next writes servo tracks according to the servo-format writing algorithm chosen by step 218. It should be noted that the servo tracks may be written exclusively with the SIM or the NFT, or collectively with the SIM condensing laser radiation through the NFT. Finally in step 224, user provided data is written and read to predefined data tracks of the recording lamination.

It should be noted that while the routine 210 can provide a data storage media tuned for operation with both a SIM and an NFT, the routine 210 is not limited to the steps and provided in FIG. 7. That is, the various aspects of the routine 210 can be altered, moved, and omitted without deterring from the spirit of the present disclosure. Furthermore, any number of steps can be added to the routine 210 to more succinctly provide the manner in which a data storage media can be made and used.

It is particularly noted that the various embodiments illustrated in the present disclosure can provide data storage media with tuned manufacturing and operational characteristics. Construction of the multi-layer recording lamination with a tuning layer configured in relation to both the curvature of a SIM and construction of a recording layer can allow exclusive use of a SIM to write servo format marks wide enough to span multiple user data tracks, thus reducing manufacturing time and allowing efficient servo-writing algorithms to be employed.

Moreover, the tuning layer can reduce sensitivity to head-disk spacing during manufacturing while allowing user defined data access operations to be carried out exclusively with an NFT, despite the predetermined coercivity corresponding to HAMR operation. It will be appreciated that the various embodiments discussed herein have numerous potential applications and are not limited to a certain field of electronic media or type of data storage devices.

It is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A data storage device comprising:
a multi-layer heat assisted magnetic recording (HAMR) lamination with a predetermined coercivity provided by a recording layer disposed between a protective layer and a magnetic tuning layer, the tuning layer having a predetermined thickness allowing at least one magnetic servo format mark spanning a plurality of data tracks to be recorded with a solid immersion mirror (SIM) without a near field transducer (NFT) and program a user data bit to a single data track of the multi-layer recording lamination with a NFT, the at least one servo format mark being smaller in size than a servo track and positioning the servo track in a predetermined pattern.

2. The data storage media of claim 1, wherein the predetermined coercivity is tuned to provide data programming with a laser positioned on a heat assisted magnetic recording (HAMR) head.

3. The data storage media of claim 2, wherein the SIM condenses the laser radiation to a predetermined spot size.

4. The data storage media of claim 3, wherein the predetermined spot size is approximately 150 nm.

5. The data storage media of claim 1, wherein at least the predetermined thickness corresponds to the predetermined coercivity.

6. The data storage media of claim 1, wherein each of the plurality of data tracks are approximately 50-60 nm wide.

7. The data storage media of claim 1, wherein each servo format mark continuously spans to the plurality of data tracks.

8. The data storage media of claim 1, wherein the SIM has a predetermined curvature corresponding to the plurality of data tracks.

9. The data storage media of claim 1, wherein the plurality of data tracks comprise 2-3 different data tracks.

10. The data storage media of claim 1, wherein the tuning layer is configured to provide multiple different a predetermined thermal profiles through the multi-layer recording lamination.

11. The data storage media of claim 10, wherein the NFT is used without the SIM to program the user data bit.

12. A method comprising:
equipping a multi-layer heat assisted magnetic recording (HAMR) lamination with a predetermined coercivity by positioning a recording layer between a protective layer and a magnetic tuning layer; and
configuring the tuning layer with a predetermined thickness to allow at least one servo format mark to be recorded for a plurality of data tracks with a first solid immersion mirror (SIM) without a near field transducer (NFT); and
programming a user data bit to a single data track of the multi-layer recording lamination the NFT, the at least one servo format mark being smaller in size than a servo track and positioning the servo track in a predetermined pattern.

13. The method of claim 12, wherein the first SIM programs is the at least one servo format mark on the plurality of data tracks and a second SIM is used concurrently with the NFT to program the user data bit.

14. The method of claim 12, wherein the NFT programs to a single data track at a time.

15. The method of claim 12, wherein a servo-format writing algorithm is used to configure the at least one servo format mark as part of a multi-disk servo writing system.

16. The method of claim 12, wherein the at least one servo format mark is used to write a non-user defined servo track in the predetermined pattern.

17. The method of claim 12, wherein the SIM records the at least one servo format mark with reduced sensitivity to a head-disk spacing compared to the NFT.

18. A method comprising:
equipping a first heat assisted magnetic recording (HAMR) head with a first solid immersion mirror (SIM) and without a near field transducer (NFT);
equipping a second HAMR head with a second SIM and a NFT; and
configuring a multi-layer heat assisted magnetic recording (HAMR) lamination with a predetermined coercivity by positioning a recording layer between a protective layer and a magnetic tuning layer, the tuning layer having a predetermined thickness providing multiple different thermal profiled through the multi-layer recording lamination to allow at least one servo format mark to be recorded for a plurality of data tracks with the first HAMR head and a user data bit to be programmed to a single data track of the multi-layer recording lamination with the second SIM and NFT of the second HAMR head, the at least one servo format mark being smaller in size than a servo track and positioning the servo track in a predetermined pattern.

19. The method of claim 18, wherein the first HAMR head is configured to condense laser radiation with the first SIM to a predetermined width sufficient to write the at least one servo format mark.

20. The method of claim 18, wherein the first HAMR head is utilized during a manufacturing process and the second HAMR head is utilized subsequent to the manufacturing process.

\* \* \* \* \*

UNITED STATES PATENT AND TRADEMARK OFFICE
CERTIFICATE OF CORRECTION

PATENT NO. : 8,982,678 B2
APPLICATION NO. : 13/442483
DATED : March 17, 2015
INVENTOR(S) : Edward Charles Gage et al.

It is certified that error appears in the above-identified patent and that said Letters Patent is hereby corrected as shown below:

In The Claims

In Col. 6, line 14
delete "a"

In Col. 6, line 35
delete "is"

Signed and Sealed this
Seventeenth Day of May, 2016

Michelle K. Lee
*Director of the United States Patent and Trademark Office*